United States Patent
Joncheray et al.

(10) Patent No.: US 11,434,320 B2
(45) Date of Patent: Sep. 6, 2022

(54) LONG TERM IMPROVEMENT OF THERMAL INSULATION VALUES IN RIGID POLYISOCYANURATE/POLYURETHANE COMPRISING INSULATION FOAMS

(71) Applicant: HUNTSMAN INTERNATIONAL LLC, The Woodlands, TX (US)

(72) Inventors: Thomas Julien Joncheray, Woluwe Saint Pierre (BE); Jan Vandenbroeck, Scherpenheuvel-Zichem (BE); Linda Carillo, Biandronno (IT); Kristof Dedecker, Leefdaal (BE); Gilles Jean Geumez, Waterloo (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 17/051,475

(22) PCT Filed: Apr. 30, 2019

(86) PCT No.: PCT/EP2019/061000
§ 371 (c)(1),
(2) Date: Oct. 29, 2020

(87) PCT Pub. No.: WO2019/211259
PCT Pub. Date: Nov. 7, 2019

(65) Prior Publication Data
US 2021/0238337 A1 Aug. 5, 2021

(30) Foreign Application Priority Data

May 3, 2018 (EP) .................................... 18170563

(51) Int. Cl.
| | |
|---|---|
| B32B 15/04 | (2006.01) |
| B32B 15/20 | (2006.01) |
| B32B 27/08 | (2006.01) |
| B32B 27/28 | (2006.01) |
| B32B 27/30 | (2006.01) |
| B32B 27/34 | (2006.01) |
| B32B 27/36 | (2006.01) |
| B32B 5/20 | (2006.01) |
| C08G 18/09 | (2006.01) |
| C08G 18/16 | (2006.01) |
| C08G 18/18 | (2006.01) |
| C08G 18/20 | (2006.01) |
| C08G 18/22 | (2006.01) |
| C08G 18/42 | (2006.01) |
| C08G 18/48 | (2006.01) |
| C08G 18/50 | (2006.01) |
| C08G 18/76 | (2006.01) |
| C08J 9/00 | (2006.01) |
| C08J 9/14 | (2006.01) |
| C08J 9/36 | (2006.01) |
| C08K 3/22 | (2006.01) |

(52) U.S. Cl.
CPC ........... *C08G 18/092* (2013.01); *C08G 18/16* (2013.01); *C08J 9/146* (2013.01); *C08K 3/22* (2013.01); *C08G 2110/0025* (2021.01); *C08J 2203/142* (2013.01); *C08J 2203/164* (2013.01); *C08J 2375/12* (2013.01)

(58) Field of Classification Search
CPC ............................. C08G 18/16; C08G 18/225
See application file for complete search history.

(56) References Cited

U.S. PATENT DOCUMENTS

| | | | |
|---|---|---|---|
| 5,649,430 A | 7/1997 | Ward, III | |
| 9,528,260 B2 * | 12/2016 | Daems | .................... B32B 15/20 |
| 2012/0313035 A1 * | 12/2012 | Williams | ........... C08G 18/4208 |
| | | | 252/182.24 |

FOREIGN PATENT DOCUMENTS

| | | |
|---|---|---|
| EP | 0618253 | 10/1994 |
| EP | 1031601 | 8/2000 |
| EP | 3000592 | 3/2016 |
| JP | S633166 | 1/1988 |
| JP | 2000109593 A * | 4/2000 |

OTHER PUBLICATIONS

Machine translation of JP-2000109593-A obtained from the European Patent Office website in Dec. 2021 (Year: 2021).*
Written translation of Tables of JP-2000109593-A obtained from the Scientific and Technical Information Center at the U.S. Patent and Trademark Office in Nov. 2021 (Year: 2021).*
International Search Report received in corresponding application No. PCT/EP2019/061000 completed on Jul. 12, 2019 and dated Aug. 5, 2019.
Written Opinion received in corresponding application No. PCT/EP2019/061000 completed on Jul. 12, 2019 and dated Aug. 5, 2019.

* cited by examiner

*Primary Examiner* — Melissa A Rioja
(74) *Attorney, Agent, or Firm* — Huntsman International LLC; Robert Diaz

(57) ABSTRACT

Polyisocyanurate (PIR) and/or polyurethane (PUR) comprising insulation foams having significantly improved long term insulation values are disclosed as well as a processing method to fabricate said improved insulation foams and use of the improved insulation foams for thermal insulation.

11 Claims, 6 Drawing Sheets

LONG TERM IMPROVEMENT OF THERMAL INSULATION VALUES IN RIGID POLYISOCYANURATE/POLYURETHANE COMPRISING INSULATION FOAMS

CROSS-REFERENCE TO RELATED APPLICATIONS

This application is the National Phase of International Application PCT/EP2019/061000 filed Apr. 30, 2019 and which claims priority to European Application Serial No. 18170563.3 filed May 3, 2018. The noted applications are incorporated herein by reference.

FIELD OF INVENTION

The present invention is related to (semi) rigid polyisocyanurate (PIR) and/or polyurethane (PUR) comprising insulation foams having significantly improved long term insulation values when used under diffusion tight conditions such that low thermal conductivity (lambda value) is achieved during the average economic lifetime of the foam.

Further the present invention is related to a process for preparing said polyisocyanurate (PIR) and/or polyurethane (PUR) comprising insulation foams and the use of blowing agents having low lambda gas values (≤12 mW/m·K at 10° C.) in combination with a predetermined amount of $CO_2$ scavengers.

BACKGROUND

After fabrication, it is well known that closed cell rigid polyisocyanurate (PIR) and polyurethane (PUR) comprising insulation foams generally contain $CO_2$ which is released during foaming.

As the thermal conductivity (expressed in mW/m·K and noted as "lambda" or "λ" value) of $CO_2$ gas is higher than the thermal conductivity of commonly used physical blowing agents, the total lambda value of a given PUR and PR comprising foam is typically higher than if $CO_2$ gas was not present.

To solve that problem, the $CO_2$ could be removed from the cell gas mixture after foam production, for instance by the use of $CO_2$ scavengers incorporated within the foam.

A variety of $CO_2$ scavengers have been previously identified and successfully used for isocyanate-based foams (EP 1 031 601 and EP 0 618 253), such as for instance zeolites, calcium hydroxide, sodium hydroxide, lithium hydroxide, . . . .

U.S. Pat. No. 5,649,430 discloses a method for preparing an insulating foam of low thermal conductivity which comprises blowing a resin with a gaseous mixture comprising carbon dioxide (the reaction of water and isocyanate giving carbon dioxide which is acting as a blowing agent) and sealing said foam in a gas-impervious enclosure with at least one gas having a thermal conductivity less than that of carbon dioxide, at least one solid alkaline getter capable of carbon dioxide removal and at least one drying agent. The molar ratios of the "getter" to theoretical carbon dioxide as interpreted in U.S. Pat. No. 5,649,430 and of drying agent to theoretical water formed should be in the range of about 1-3:1 and preferably about 1.1-2.0:1.

EP 1031601 discloses foamed insulating material having an alkali metal carbonate or an alkaline-earth metal carbonate formed by a reaction of an alkali metal hydroxide or an alkaline-earth metal hydroxide with carbon dioxide, and a water adsorbent having a moistened water-absorbing substance covered with a resinous coating film. EP'601 discloses examples made using an isocyanate index below 100.

On the other hand, the criteria for thermal insulation foams, especially for use in construction and consumer goods, become more and more stringent and there is a need to further improve (i.e. reduce) the lambda value (thermal conductivity) of PUR and PIR comprising foams and to maintain the low lambda value over the whole life time of the foam.

To further improve the lambda value of PUR and PR comprising foams, alternative blowing agents with very low thermal conductivity were implemented such as Hydro Fluoro Carbons (HFC's). Very recently Hydro Fluoro Olefins (HFO's) and Hydro Chloro Fluoro Olefins (HCFO's) were also implemented.

It is however a challenge to both achieve the removal of $CO_2$ gas in a PUR or PIR comprising insulation foam and to improve the lambda value significantly thereby avoiding an overdose and/or negative impact of a residual amount of scavenger and to obtain PUR or PIR comprising foams which have very low thermal conductivity which also remains low over long time periods (at least during the average economic lifetime of the foam).

Goal of the Invention

It is the goal of the invention to improve the thermal insulation of polyisocyanurate (PR) and/or polyurethane (PUR) comprising insulation foams significantly and to maintain the superior thermal insulation properties (i.e. the low lambda values) over long time periods.

The goal of the invention is achieved by a combination of following steps/precautions:
  capturing the $CO_2$ released during foaming and during ageing, in combination with
  use and presence of blowing agents having low thermal conductivity, and
  covering the foam with a sealing which prohibits exchange of air between the foam and the environment and which covers at least 50% of the surface of the foam.

Therefore, the present invention relates to novel polyisocyanurate (PR) and/or polyurethane (PUR) comprising insulation foams having significantly improved insulation values maintained over the average economic lifetime of the foam, a novel processing method to fabricate said improved insulation foams and use of the improved insulation foams for thermal insulation.

SUMMARY OF THE INVENTION

According to a first aspect of the invention, a stabilized aged polyisocyanurate (PIR) comprising insulation foam made at an isocyanate index above 180 and/or polyurethane (PUR) comprising insulation foam made at an isocyanate index in the range 123-180 is disclosed. Said foam comprising:
  At least one physical blowing agent with a lambda gas ≤12 mW/m·K at 10° C.
  At least one $CO_2$ scavenging compound selected from NaOH and/or KOH and reaction product of said $CO_2$ scavenging compound with $CO_2$,
  A gas diffusion tight sealing to avoid exchange of air between the foam and the environment and which covers at least 50% of the foam surfaces.
  wherein the molar % $CO_2$ in the stabilized aged foam is between 0 and 33% calculated on the total moles of $CO_2$ and physical blowing agents in the stabilized aged foam and the amount of residual $CO_2$ scavenging compound in the stabilized aged foam is between 0 and 10 wt % calculated on the total weight of the stabilized aged foam.

According to embodiments of the invention, the molar % $CO_2$ in the stabilized aged foam is between 0 and 30%, more preferably between 0 and 27% calculated on the total moles of $CO_2$ and physical blowing agents in the stabilized aged foam.

According to embodiments of the invention, the amount of residual scavenging compound in the stabilized aged foam is between 0 and 5 wt %, more preferably between 0 and 3 wt % calculated on the total weight of the stabilized aged foam.

According to embodiments of the invention, the $CO_2$ scavenging compound is selected from NaOH and/or KOH.

According to embodiments of the invention, the at least one $CO_2$ scavenging compound is selected from NaOH and/or KOH, the molar % $CO_2$ in the stabilized aged foam is between 0 and 33%, preferably between 0 and 30%, more preferably between 0 and 27%, calculated on the total moles of $CO_2$ and physical blowing agents in the stabilized aged foam and the amount of residual $CO_2$ scavenging compound in the stabilized aged foam is between 0 and 5 wt %, more preferably between 0 and 3 wt % calculated on the total weight of the stabilized aged foam.

According to embodiments of the invention, the gas diffusion tight sealing is selected from gas barrier polymeric resin layers such as Ethylene Vinyl Alcohol (EVOH) copolymer resin layers or multilayers comprising said resin layers and combinations thereof and wherein at least 90%, more preferably 95%, most preferably 90-100% of the foam surfaces are covered with the gas diffusion tight sealing.

According to embodiments of the invention, the gas diffusion tight sealing is selected from metal foils such as Aluminum foil or metal multilayers comprising Aluminum foil and wherein 50-95%, more preferably 50-85%, most preferably 50-75% of the foam surfaces are covered with the gas diffusion tight sealing.

According to embodiments of the invention, the blowing agents comprise HFO blowing agents and/or HCFO blowing agents and/or hydrocarbon blowing agents such as cyclopentane having a lambda gas value ≤12 mW/m·K at 10° C. and mixtures thereof.

According to embodiments of the invention, the blowing agents comprise cis 1,1,1,4,4,4-hexafluorobut-2-ene and/or trans 1-chloro-3,3,3-trifluoropropene.

According to embodiments of the invention, the blowing agent comprises chlorofluorocarbons (CFCs) and/or hydrofluorocarbons (HFCs) and/or hydrochlorofluorocarbons (HCFCs) having a lambda gas value ≤12 mW/m·K at 10° C.

According to a second aspect of the invention, a method for making the stabilized aged polyisocyanurate (PIR) and/or polyurethane (PUR) comprising insulation foam according to the invention is disclosed, said method comprising:
 a) Combining and/or mixing at least the following ingredients at an isocyanate index in the range 123-180 for a polyurethane (PUR) comprising insulation foam and at an isocyanate index above 180 for a polyisocyanurate (PIR) comprising insulation foam
 a polyisocyanate composition comprising one or more polyisocyanate compounds, and
 at least one catalyst compound suitable for making the polyisocyanurate (PR) and/or polyurethane (PUR) comprising foam, and
 an isocyanate-reactive composition comprising one or more isocyanate reactive compounds, and
 at least one physical blowing agent having a lambda gas value ≤12 mW/m·K at 10° C., and
 at least one $CO_2$ scavenging compound selected from NaOH and/or KOH, and then
 b) Covering at least 50% of the foam surfaces with a gas diffusion tight sealing to avoid exchange of air between the foam and the environment, and then
 c) Ageing the foam to achieve a stabilized aged foam Characterised in that the foam is covered with a gas diffusion tight sealing and the amount of $CO_2$ scavenging compound is such that the molar % $CO_2$ in the stabilized aged foam is between 0 and 33% calculated on the total moles of $CO_2$ and physical blowing agents in the stabilized aged foam and the amount of residual scavenging compound in the stabilized aged foam is between 0 and 10 wt % calculated on the total weight of the stabilized aged foam and wherein the ratio of the molar amount of scavenging compound [X] to be added over the theoretical calculated molar amount of $CO_2$ [$X_1$] generated by the reaction of the molar amount of water with isocyanate being present in the formulation used to make the foam [X]/[$X_1$] is higher than 3.

According to embodiments of the invention, the method for making the stabilized aged polyisocyanurate (PIR) and/or polyurethane (PUR) comprising insulation foam according to the invention is performed at an isocyanate index of 180 or higher, more preferably at an isocyanate index higher than 250 and the catalyst compound is selected from at least one trimerisation catalyst and the insulation foam is a polyisocyanurate (PIR) comprising foam.

According to embodiments of the invention, the foam is a polyisocyanurate (PIR) comprising insulation foam and the method is performed at an isocyanate index of 180 or higher, more preferably at an isocyanate index higher than 250 and the ratio of the molar amount of scavenging compound [X] to be added over the theoretical calculated molar amount of $CO_2$ [X1] generated by the reaction of the molar amount of water with isocyanate being present in the formulation used to make the foam [X]/[X1] is higher than 6, preferably higher than 10, more preferably higher than 15.

According to embodiments of the invention, the method for making the stabilized aged polyisocyanurate (PIR) and/or polyurethane (PUR) comprising insulation foam according to the invention is performed at an isocyanate index in the range 123-180 and the catalyst compound is selected from at least one polyurethane catalyst and the insulation foam is a polyurethane (PUR) comprising foam.

According to embodiments of the invention, the method for making the stabilized aged polyisocyanurate (PIR) and/or polyurethane (PUR) comprising insulation foam according to the invention uses polyisocyanate compounds selected from a toluene diisocyanate, a methylene diphenyl diisocyanate or a polyisocyanate composition comprising a methylene diphenyl diisocyanate or a mixture of such polyisocyanates.

According to embodiments of the invention, the method for making the stabilized aged polyisocyanurate (PIR) and/or polyurethane (PUR) comprising insulation foam according to the invention uses one or more isocyanate reactive compounds selected from polyols and polyol mixtures having average hydroxyl numbers of from 50 to 1000, especially from 150 to 700 mg KOH/g, and hydroxyl functionalities of from 2 to 8, especially from 3 to 8.

According to embodiments of the invention, the method for making the stabilized aged polyisocyanurate (PIR) and/ or polyurethane (PUR) comprising insulation foam according to the invention uses blowing agents in an amount of 1 to 60 parts by weight, preferably from 2 to 45 parts by weight per hundred parts by weight isocyanate reactive compounds.

According to embodiments of the invention, the method for making the stabilized aged polyisocyanurate (PIR) and/or polyurethane (PUR) comprising insulation foam according to the invention uses beside the blowing agents having a lambda gas value ≤12 mW/m·K at 10° C. additional blowing agents having a lambda gas value >12 mW/m·K at 10° C. and the ratio of blowing agents having a lambda gas value ≤12 mW/m·K at 10° C. to the additional blowing agents is in the weight ratio 95/5 up to 5/95 calculated on the total weight of all blowing agents.

According to a third aspect of the invention, the use of the polyisocyanurate (PR) and/or polyurethane (PUR) comprising insulation foam according to the invention for thermal insulation, acoustic insulation and/or in structural panels is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

Definitions and Terms

In the context of the present invention the following terms have the following meaning:
1) The expression "isocyanate index" or "NCO index" or "index" as used herein refers to the ratio of NCO-groups over isocyanate-reactive hydrogen atoms present in a formulation, given as a percentage:

$$\frac{[NCO] \times 100}{[active\ hydrogen]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive compounds" (also referred to as iso-reactive compounds) and "isocyanate-reactive hydrogen atoms" as used herein for the purpose of calculating the isocyanate index refers to the total of active hydrogen atoms in hydroxyl and amine groups present in the isocyanate reactive compounds; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
3) "Reaction system" as used herein refers to a combination of compounds wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.
6) "Trimerization catalyst" as used herein refers to a catalyst being able to catalyse (promote) the formation of isocyanurate groups from polyisocyanates. This means that isocyanates can react with one another to form macromolecules with isocyanurate structures (polyisocyanurate=PIR). Reactions between isocyanates-polyols and isocyanates-isocyanates (homopolymerization) can take place simultaneously or in direct succession, forming macromolecules with urethane and isocyanurate structures (PIR-PUR).
7) "Polyisocyanurate comprising material" (PIR) or "PIR foam" as used herein refers to a material made at an isocyanate index of 180 or higher, more preferably at an isocyanate index higher than 250.
8) "Polyurethane comprising material" (PUR) or "PUR foam" as used herein refers to a material made at an isocyanate index in the range 123-180.
9) "Foam density" as used herein refers to the density measured on foam samples and is calculated as weight/volume and is expressed in $kg/m^3$.
10) "Thermal conductivity" measurements are carried out at 10° C. according to ISO8301 using a Heat Flow Meter (HFM) apparatus. "Lambda value", "λ value" or "k value" as used herein refers to the thermal conductivity of a material normally expressed in mW/m·K. The lower the lambda value the better the thermal insulation performance.
11) Closed and open cell content of a foam is measured using a pycnometer according to ISO 4590.
12) "Stabilized lambda value", "Stabilized λ value" and "Stabilized k value" of a foam as used herein refers to a thermal conductivity value at 10° C. (according to ISO8301) which is not changing over time (variations ≤0.5 mW/m·K). For foams according to the invention, a stabilized lambda value is achieved after the time required to capture the $CO_2$ by the $CO_2$ scavenging compound according to the invention (after completion of the $CO_2$ scavenging process). The completion of the $CO_2$ scavenging process can take hours up to several months depending on the size of the foam and the type of sealing used.

13) "Ageing" refers to a treatment of a foam wherein the foam is being kept at a certain temperature for a given amount of time.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

The present invention relates to polyisocyanurate (PIR) and/or polyurethane (PUR) comprising insulation foams suffering from deteriorated insulation values due to the formation of $CO_2$.

When applying the state of the art processes (e.g. U.S. Pat. No. 5,649,430) for making (semi) rigid polyisocyanurate (PIR) and/or polyurethane (PUR) comprising insulation foams the $CO_2$ scavenger (NaOH) was added in a maximum amount corresponding to a molar ratio 3:1 expressed as $CO_2$ scavenger (NaOH) versus the theoretical mol of carbon dioxide generated by the isocyanate reaction with the water present in the formulation.

However, it was found that, in such conditions, the stabilized lambda is only minimally improved compared to the same PU foam without scavenger. After measuring the cell gas composition, it was found that a very relevant amount of carbon dioxide was still present, which explains the poor lambda reduction.

It was found that the use of an amount of $CO_2$ scavenger compound selected from potassium hydroxide and/or sodium hydroxide higher than the recommended amount leads to lower values of stabilized aged lambda, which corresponded to lower levels of measured carbon dioxide.

It was further found that, depending on the type of PU foam and depending on the processing condition, different amounts of scavenger are needed to have a significant reduction of the stabilized aged lambda value.

It was also found that using too high amounts of scavenger it is possible to remove all the carbon dioxide, but with the following drawbacks:

Some unreacted sodium hydroxide remains in the foam, which is not desired since it could lead to EHS issues and corrosion problems in the end products.

The presence in the foam of a high amount of solid (as reaction products and as unreacted scavenger) can negatively impact the foam quality, the physical and mechanical properties, and potentially also the thermal conductivity.

To solve the problems above mentioned, the present invention describes the conditions and the method which allow to optimize the use of the scavenger with the goal to:

Maximize the reduction of the stabilized aged lambda value

Minimize the residual amount of unreacted sodium hydroxide

The present invention hence developed a method in which an optimized amount of $CO_2$ scavenger compound is added to the formulations used to make said foams which captures most of the $CO_2$ formed during foaming and ageing and which minimizes the amount of residual unreacted $CO_2$ scavenger compound in combination with the addition of a gas tight sealing and use of blowing agent with lambda $\leq 12$ mW/m·k.

The present invention therefore relates to novel polyisocyanurate (PIR) and/or polyurethane (PUR) comprising insulation foams having significantly improved thermal insulation values maintained over the average economic lifetime of the foam, a novel processing method to fabricate said improved thermal insulation foams and use of the improved insulation foams for thermal insulation.

According to a first aspect, a polyisocyanurate (PIR) and/or polyurethane (PUR) comprising insulation foam is disclosed having significantly improved thermal insulation properties maintained over the average economic lifetime of the foam.

The polyisocyanurate (PIR) and/or polyurethane (PUR) foam of the invention is comprising:

At least one physical blowing agent with a lambda gas $\leq 12$ mW/m·K at 10° C., At least one $CO_2$ scavenging compound selected from KOH and/or NaOH and/or reaction product of said $CO_2$ scavenging compound with $CO_2$, A sealing to avoid exchange of air between the foam and the environment (a gas diffusion tight sealing) and which covers at least 50% of the foam surfaces.

According to the invention, the molar % $CO_2$ in the stabilized aged foam is between 0 and 33% calculated on the total moles of $CO_2$ and physical blowing agents in the stabilized aged foam and the amount of residual scavenging compound in the stabilized aged foam is between 0 and 10 wt % calculated on the total weight of the stabilized aged foam.

According to embodiments, the foam according to the invention has preferably a molar % $CO_2$ in the stabilized aged foam between 0 and 30%, more preferably between 0 and 27% calculated on the total moles of $CO_2$ and physical blowing agents in the stabilized aged foam.

According to embodiments, the foam according to the invention has preferably an amount of residual scavenging compound in the stabilized aged foam between 0 and 5 wt %, more preferably between 0 and 3 wt % calculated on the total weight of the stabilized aged foam.

According to embodiments, the at least one $CO_2$ scavenging compound is selected from NaOH and/or KOH and combinations thereof.

According to embodiments, the at least one $CO_2$ scavenging compound is selected from NaOH and/or KOH and the molar % $CO_2$ in the stabilized aged foam is between 0 and 33%, preferably between 0 and 30%, more preferably between 0 and 27%, calculated on the total moles of $CO_2$ and physical blowing agents in the stabilized aged foam.

According to embodiments, the at least one $CO_2$ scavenging compound is selected from NaOH and/or KOH and the amount of residual scavenging compound in the stabilized aged foam is between 0 and 5 wt %, more preferably between 0 and 3 wt % calculated on the total weight of the stabilized aged foam.

According to embodiments, the polyisocyanurate (PIR) and/or polyurethane (PUR) comprising insulation foam of the invention has a stabilized aged lambda value which is at least 1 mW/m·K at 10° C. lower compared to state of the art polyisocyanurate (PR) and/or polyurethane (PUR) insulation foams using equal amounts and type of blowing agents but without using $CO_2$ scavengers after the same period of time.

According to embodiments, the polyisocyanurate (PIR) and/or polyurethane (PUR) comprising insulation foam according to the invention is kept under air diffusion tight conditions and the gas diffusion tight sealing is selected from gas barrier polymeric resin layers such as Ethylene Vinyl Alcohol (EVOH) copolymer resin layers or multilayers comprising said resin layers and combinations thereof and at least 50%, preferably at least 90%, more preferably 95%, most preferably 90-100% of the foam surfaces are covered with the gas diffusion tight sealing.

According to preferred embodiments, the sealing is a moisture permeable layer, preferably comprising at least an ethylene vinyl alcohol (EVOH) copolymer resin layer as gas barrier polymer.

According to embodiments, the sealing may comprise at least one layer of a gas barrier polymer selected from ethylene vinyl alcohol copolymer (EVOH), polyvinyl alcohol (PVOH) and its copolymers, polyvinylidene chloride (PVDC), polyamide (PA), polyethylene terephthalate (PET), Polyketones (PK), Polyacrilonitriles (PAN) and combinations thereof. The gas barrier polymer layer may further comprise one or more additional layers which can, for example, comprise or consist of a thermoplastic polymer such as polyethylene and/or polypropylene. Further suitable sealings for use in the present invention are disclosed in EP 3 000 592.

According to embodiments, the polyisocyanurate (PIR) and/or polyurethane (PUR) comprising insulation foam according to the invention is kept under air diffusion tight conditions and the gas diffusion tight sealing is selected from metal foils such as Aluminum foil or metal multilayers comprising Aluminum foil and wherein at least 50%, preferably 50-95%, more preferably 50-85%, most preferably 50-75% of the foam surfaces are covered with the gas diffusion tight sealing.

According to embodiments, the polyisocyanurate (PIR) and/or polyurethane (PUR) comprising insulation foam according to the invention may further comprise (optionally) in its formulation one or more surfactants, one or more flame retardants, water, one or more antioxidants, one or more auxiliary blowing agents, one or more auxiliary urethane catalysts, one or more auxiliary trimerisation catalysts, or combinations thereof.

The polyisocyanurate (PIR) and/or polyurethane (PUR) comprising insulation foams according to the invention will give rise (after a stabilizing period wherein the scavenger is capturing the $CO_2$) to insulation foams having significantly low thermal conductivity. Said polyisocyanurate (PIR) and/or polyurethane (PUR) comprising insulation foams may have a stabilized aged thermal conductivity over time which is lower than the initial thermal conductivity immediately after production of the foam due to the consumption of $CO_2$ by the $CO_2$ scavenger, the use of blowing agents having a lambda gas value ≤12 mW/m·K at 10° C. such as HFO/HCFO comprising blowing agents and the diffusion tight conditions.

According to embodiments, the $CO_2$ scavenger compound may be selected from NaOH particles/beads with for example an average diameter >100 micrometers (μm) and <1-2 mm.

According to preferred embodiments, the blowing agents are selected from at least HFO blowing agents and/or HCFO blowing agents and/or hydrocarbons such as cyclo-pentane having a lambda gas value ≤12 mW/m·K at 10° C.

According to preferred embodiments, the blowing agents comprise at least HFO blowing agents and/or HCFO blowing agents and/or hydrocarbon such as cyclo-pentane having a lambda gas value ≤12 mW/m·K at 10° C.

According to embodiments, the blowing agents comprise at least 3,3,3-trifluoropropene, 1,2,3,3,3-pentafluoropropene, cis- and/or trans-1,3,3,3-tetrafluoropropene and/or 2,3,3,3-tetrafluoropropene, and/or 1,1,1,4,4,4-hexafluorobut-2-ene, and/or 1-chloro-3,3,3-trifluoropropene, and/or 2-chloro-3,3,3-trifluoropropene and mixtures thereof.

Preferred examples of commercially available suitable HFO blowing gases are Honeywell HFO-1234ze (Honeywell's trade name for trans-1,3,3,3-tetrafluoropropene) or Opteon® 1100 (Chemours' trade name for cis-1,1,1,4,4,4-hexafluorobut-2-ene, $CF_3CH=CHCF_3$).

A preferred example of a commercially available suitable HCFO blowing gas is Honeywell Solstice® 1233zd (Honeywell's trade name for trans-1-chloro-3,3,3-trifluoropropene, $CHCl=CHCF_3$) or Forane® 1233zd (Arkema's trade name for trans-1-chloro-3,3,3-trifluoropropene, $CHCl=CHCF_3$).

According to embodiments, the foam according to the invention may comprise blowing agents having a lambda gas value ≤12 mW/m·K at 10° C. selected from hydrofluorocarbons (HFCs) and/or hydrocarbons such as cyclo-pentane and mixtures thereof.

According to embodiments, the foam according to the invention may further comprise blowing agents such as hydrocarbons selected from iso-pentane, iso-butane, n-pentane and mixtures thereof having a lambda gas value >12 mW/m·K at 10° C.

According to embodiments, the blowing agents may further comprise additional blowing agents selected from formic acid, methylformate, dimethyl ether, water, methylene chloride, acetone, t-butanol, argon, krypton, xenon and mixtures thereof.

According to a second aspect, a process for making the polyisocyanurate (PIR) and/or polyurethane (PUR) comprising insulation foam according to the invention is disclosed.

The process for making the polyisocyanurate (PIR) and/or polyurethane (PUR) comprising insulation foam according to the invention may comprise combining and/or mixing at an isocyanate index in the range 123-180 for a polyurethane (PUR) comprising insulation foam and at an isocyanate index above 180 for a polyisocyanurate (PIR) comprising insulation foam at least following compounds:

a polyisocyanate composition comprising one or more polyisocyanate compounds, and at least one catalyst compound suitable for making the polyisocyanurate (PR) and/or polyurethane (PUR) comprising foam, and an isocyanate-reactive composition comprising one or more isocyanate reactive compounds, and at least one physical blowing agent having a lambda gas value ≤12 mW/m·K at 10° C., and at least one $CO_2$ scavenging compound selected from NaOH and/or KOH and reaction products of said $CO_2$ scavenging compound with $CO_2$ Characterised in that the foam is covered with an air tight sealing and the amount of $CO_2$ scavenging compound is such that the molar % $CO_2$ in the stabilized aged foam is between 0 and 33% calculated on the total moles of $CO_2$ and physical blowing agents in the stabilized aged foam and the amount of residual scavenging compound in the stabilized aged foam is between 0 and 10 wt % calculated on the total weight of the stabilized aged foam and wherein the ratio of the molar amount of scavenging compound [X] to be added over the theoretical calculated molar amount of $CO_2$ [$X_1$] generated by the reaction of the molar amount of water with isocyanate being present in the formulation used to make the foam [X]/[$X_1$] is higher than 3.

According to the invention an optimized amount of $CO_2$ scavenger compound needs to be added to the formulations used to make the PIR and/or PUR comprising insulation foam of the invention, wherein said optimized amount of $CO_2$ scavenger compound captures the $CO_2$ formed during foaming and ageing and which minimizes the amount of residual unreacted $CO_2$ scavenger compound. To achieve that goal, the molar amount of scavenging compound [X] to be added has to be optimized according to the procedure of the current invention.

According to embodiments, the scavenging compound is selected from NaOH and/or KOH and the molar ratio [X]/[$X_1$] is higher than 3, preferably higher than 6, more preferably higher than 10, most preferably higher than 15. Wherein [X]=the molar amount of scavenging compound [X] to be added and [$X_1$]=the theoretical calculated molar amount of $CO_2$ generated by the reaction of the molar amount of water with isocyanate being present in the formulation used to make the foam.

According to embodiments, the foam is a polyurethane (PUR) comprising insulation foam, the scavenging compound is selected from NaOH and/or KOH and the molar ratio [X]/[$X_1$] is higher than 3. Wherein [X]=the molar amount of scavenging compound [X] to be added and [$X_1$]=the theoretical calculated molar amount of $CO_2$ generated by the reaction of the molar amount of water with isocyanate being present in the formulation used to make the foam.

According to embodiments, the foam is a polyisocyanurate (PIR) comprising insulation foam, the scavenging compound is selected from NaOH and/or KOH and the molar ratio [X]/[$X_1$] is higher than 6, more preferably higher than 10, most preferably higher than 15. Wherein [X]=the molar amount of scavenging compound [X] to be added and [$X_1$]=the theoretical calculated molar amount of $CO_2$ generated by the reaction of the molar amount of water with isocyanate being present in the formulation used to make the foam.

There are many different orders of contacting or combining the compounds required to make the insulation foam of the present invention. One of skilled in the art would realize that varying the order of addition of the compounds falls within the scope of the present invention.

According to embodiments, the combining and mixing of the $CO_2$ scavenging compound(s) may be performed by adding said $CO_2$ scavenging compound(s) to the isocyanate-reactive composition before combining and/or mixing with the polyisocyanate composition (in other words the $CO_2$ scavenging compound(s) is added to the polyisocyanate-reactive composition before creating a reactive mixture).

According to embodiments, the combining and mixing of the $CO_2$ scavenging compound(s) may be performed by adding said $CO_2$ scavenging compound(s) to the polyisocyanate composition before combining and/or mixing with the isocyanate-reactive composition (in other words the $CO_2$ scavenging compound(s) is added to the polyisocyanate composition before creating a reactive mixture).

According to embodiments, the combining and mixing of the $CO_2$ scavenging compound(s) may be performed by adding said $CO_2$ scavenging compound(s) to the reactive composition, said reactive composition being created by combining and/or mixing the polyisocyanate composition, the isocyanate-reactive composition, the catalyst compound(s), and blowing agent(s) and optionally other ingredients (in other words the $CO_2$ scavenging compound(s) is added in the reactive mixture).

According to embodiments, the combining and mixing of the $CO_2$ scavenging compound(s) may be performed by adding said $CO_2$ scavenging compound(s) after lay-down of the reactive composition, said reactive composition being created by combining and/or mixing the polyisocyanate composition, the isocyanate-reactive composition, the catalyst compound(s), blowing agent(s) and optionally other ingredients.

According to embodiments, the combining and mixing of the $CO_2$ scavenging compound(s) may be performed by adding said $CO_2$ scavenging compound(s) to the reactive composition being present in a mould, said reactive composition being created by combining and/or mixing the polyisocyanate composition, the isocyanate-reactive composition, the catalyst compound(s), blowing agent(s) and optionally other ingredients.

According to embodiments, the combining and mixing of the $CO_2$ scavenging compound(s) may be performed by adding said $CO_2$ scavenging compound(s) to the mould before injecting the reactive composition in the mould, said reactive composition being created by combining and/or mixing the polyisocyanate composition, the isocyanate-reactive composition, the catalyst compound(s), blowing agent(s) and optionally other ingredients.

According to embodiments, the process for making the insulation foam according to the invention may further comprise combining and mixing one or more surfactants, one or more additives such as nucleating agents, adhesion promoters, one or more flame retardants, water, one or more antioxidants, one or more auxiliary blowing agents, one or more auxiliary urethane catalysts, one or more auxiliary trimerisation catalysts, one or more blowing catalysts or combinations thereof.

According to embodiments, the process for making the insulation foam according to the invention is performed at an isocyanate index of 180 or higher, more preferably at an isocyanate index higher than 250 and the insulation foam is a polyisocyanurate (PIR) comprising foam.

According to embodiments, the process for making the insulation foam according to the invention is performed at an isocyanate index in the range 123-180 and the insulation foam is a polyurethane (PUR) comprising foam.

According to embodiments, the insulating foam is a polyisocyanurate (PIR) comprising insulation foam and the catalyst compound is selected from at least a trimerisation catalyst compound, said catalyst should be present in the foam formulation in a catalytically effective amount. Trimerisation catalyst compounds suitable for use herein include, but are not limited to, quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates.

According to embodiments, the insulating foam is a polyurethane (PUR) comprising insulation foam and the catalyst compound is selected from at least a polyurethane catalyst compound, said catalyst should be present in the foam formulation in a catalytically effective amount. Polyurethane catalyst compounds suitable for use herein include, but are not limited to, metal salt catalysts, such as organotins, and amine compounds, such as triethylenediamine (TEDA), N-methylimidazole, 1,2-dimethylimidazole, N-methylmorpholine, N-ethylmorpholine, triethylamine, N,N'-dimethylpiperazine, 1,3,5-tris(dimethylaminopropyl) hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylenetriamine, triethanolamine, dimethylethanolamine, bis(dimethylaminoethyl)ether, tris(3-dimethylamino)propylamine, or its acid blocked derivatives, and the like, as well as any mixture thereof.

According to embodiments, the amount of $CO_2$ scavenger compound to be added to a given PUR or PR foam formulation has to be adjusted depending on the amount of $CO_2$ produced. Amounts of $CO_2$ scavenger compound (e.g. NaOH beads) in the range 1-25 wt % calculated on the total weight of the foam formulation are preferred, more preferably in the range 2-20 wt % and give rise to high quality foams (i.e. stable, fine cells, defect-free).

According to embodiments, the polyisocyanate compounds used in the process for making the polyisocyanurate (PIR) and/or polyurethane (PUR) comprising insulation foam according to the invention are selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the polyisocyanate composition comprises mixtures of polyisocyanates. For example, a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

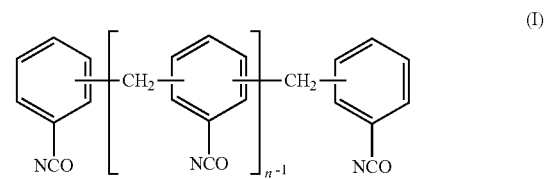

(I)

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate reactive compounds used in the process for making the polyisocyanurate (PR) and/or polyurethane (PUR) comprising insulation foam according to the invention include any of those known in the art for the preparation of said foams. Of particular importance for the preparation of rigid foams are polyols and polyol mixtures having average hydroxyl numbers of from 50 to 1000, especially from 150 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

The quantities of the polyisocyanate compositions and the one or more isocyanate reactive compounds to be reacted will depend upon the nature of the polyisocyanurate (PIR) and/or polyurethane (PUR) comprising insulation foam to be produced and can be readily determined by those skilled in the art.

According to preferred embodiments, the blowing agents are selected from at least HFO blowing agents and/or HCFO blowing agents and/or hydrocarbons such as cyclo-pentane having a lambda gas value ≤12 mW/m·K at 10° C.

According to preferred embodiments, the blowing agents comprise at least HFO blowing agents and/or HCFO blowing agents and/or hydrocarbon such as cyclo-pentane having a lambda gas value ≤12 mW/m·K at 10° C.

According to embodiments, the blowing agents comprise at least 3,3,3-trifluoropropene, 1,2,3,3,3-pentafluoropropene, cis- and/or trans-1,3,3,3-tetrafluoropropene and/or 2,3,3,3-tetrafluoropropene, and/or 1,1,1,4,4,4-hexafluorobut-2-ene, and/or 1-chloro-3,3,3-trifluoropropene, and/or 2-chloro-3,3,3-trifluoropropene and mixtures thereof.

Preferred examples of commercially available suitable HFO blowing gases are Honeywell HFO-1234ze (Honeywell's trade name for trans-1,3,3,3-tetrafluoropropene) or Opteon® 1100 (Chemours' trade name for cis-1,1,1,4,4,4-hexafluorobut-2-ene, $CF_3CH=CHCF_3$).

A preferred example of a commercially available suitable HCFO blowing gas is Honeywell Solstice® 1233zd (Honeywell's trade name for trans-1-chloro-3,3,3-trifluoropropene, $CHCl=CHCF_3$) or Forane® 1233zd (Arkema's trade name for trans-1-chloro-3,3,3-trifluoropropene, $CHCl=CHCF_3$).

According to embodiments, the foam according to the invention may comprise blowing agents having a lambda gas value ≤12 mW/m·K at 10° C. selected from hydrofluorocarbons (HFCs) and/or hydrocarbons such as cyclo-pentane and mixtures thereof.

According to embodiments, the foam according to the invention may further comprise blowing agents such as hydrocarbons selected from iso-pentane, iso-butane, n-pentane and mixtures thereof having a lambda gas value >12 mW/m·K at 10° C.

According to embodiments, the blowing agents may further comprise additional blowing agents selected from formic acid, methylformate, dimethyl ether, water, methylene chloride, acetone, t-butanol, argon, krypton, xenon and mixtures thereof.

The amount of blowing agent used can vary based on, for example, the intended use and application of the foam product and the desired foam properties and density. The blowing agent may be present in amounts from 1 to 60 parts by weight (pbw) per hundred parts by weight isocyanate reactive compounds (polyol), more preferably from 2 to 45 pbw. If (optionally) water is used as one of the blowing agents in the foam formulation, the amount of water is preferably limited to amounts up to 15 pbw, preferably <5 pbw, more preferably <3 pbw.

According to embodiments, the at least one blowing agent having a lambda gas value ≤12 mW/m·K at 10° C., may comprise additional blowing agents having a lambda gas value >12 mW/m·K at 10° C. and the ratio of blowing agent having a lambda gas value ≤12 mW/m·K at 10° C. to the additional blowing agents is in the weight ratio 95/5 up to 5/95 calculated on the total weight of all blowing agents.

According to embodiments, the at least one blowing agent is selected from HCFO and/or HFO blowing agents and comprises cyclopentane or mixtures of cyclopentane and isopentane as additional blowing agent and the ratio of HCFO and/or HFO blowing agents to cyclopentane blowing agent is in the weight ratio 95/5 up to 5/95 calculated on the total weight of all blowing agents.

According to embodiments, the polyisocyanurate (PIR) and/or polyurethane (PUR) comprising insulation foam according to the invention is a rigid insulation foam.

According to embodiments, the polyisocyanurate (PIR) and/or polyurethane (PUR) comprising insulation foam according to the invention has a foam density <45 kg/m³ and a stabilized thermal conductivity <20 mW/m·K at 10° C., preferably 14 up to 20 mW/m·K at 10° C.

According to embodiments, the polyisocyanurate (PIR) and/or polyurethane (PUR) comprising insulation foam according to the invention has a foam density >45 kg/m³ and a stabilized thermal conductivity <25 mW/m·K at 10° C., preferably 14 up to 25 mW/m·K at 10° C.

According to embodiments, the polyisocyanurate (PIR) and/or polyurethane (PUR) comprising insulation foam according to the invention has a closed cell content higher than 70% calculated on the total amount of closed and open cells being present in the material.

According to embodiments, the polyisocyanurate (PIR) and/or polyurethane (PUR) comprising foam of the instant invention may be used as thermal insulator such as construction thermal insulation foam, appliance thermal insulation foam or pipe insulation. The polyisocyanurate (PIR) and/or polyurethane (PUR) comprising insulation foam of the instant invention fulfills all the requirements for use as insulation material especially due to its low thermal conductivity value.

FIGURES

FIG. 1 illustrates the influence of the $CO_2$ scavenger on the lambda value (measured at 10° C.) in function of time (ageing at room temperature) for 1 foam made according to the invention (example 1) and for a comparative foam (comparative example 1).

FIG. 2 illustrates the influence of the blowing agent on the lambda value (measured at 10° C.) in function of time (ageing at room temperature) for 3 foams made according to the invention (example 1, example 2 and example 3) and for 2 comparative foams (comparative examples 2+3).

MEASUREMENT METHODS

Figure 1:
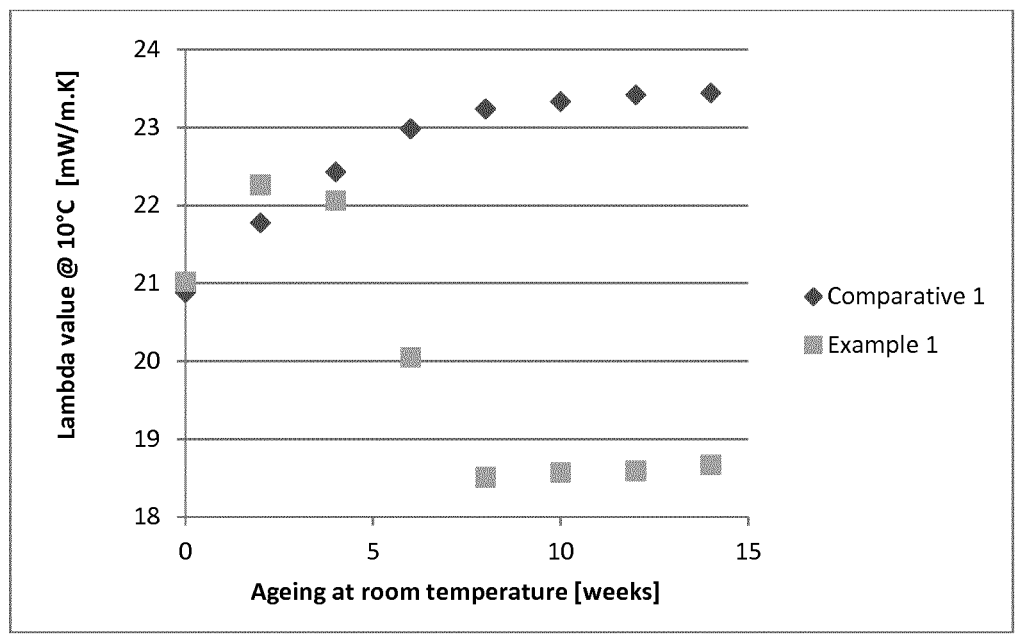

1. Titration Method to Determine the Residual Amount of Scavenger (NaOH) in the Stabilized Aged Foam A titration method is used to determine the residual amount of NaOH in the stabilized aged foam based on following reaction (which takes place in the stabilized aged foam):

$$2NaOH + CO_2 \rightarrow Na_2CO_3 + H_2O \quad [1]$$

Titration Method:
- A sufficient amount of foam is grinded and mixed with water in a closed system (sealed mixer)
- The water is filtered
- A measured amount of such filtered water is titrated with (0.5N) HCl solution
- Through the titration it is possible to determine the residual NaOH Titration Reaction:

$$NaOH + HCl \rightarrow NaCl + H_2O$$

2. Method to Determine the Amount of NaOH Required to have Optimal $CO_2$ Removal and Minimal Residual NaOH in the Aged Foam
- A foam sample with the selected formulation is made according to real processing conditions or lab scale conditions without scavenger (NaOH).
- This sample (being sufficiently sealed with diffusion tight facing according to the invention) is aged until a stable lambda value is achieved (accelerated ageing can be applied).
- Once the lambda value after ageing is stabilized, the $CO_2$ amount is measured (with Cell Gas Analysis (CGA)). This is the total $CO_2$ generated in an aged foam sample without scavenger.
- The 'stoichiometric' amount of NaOH necessary to remove the measured amount of $CO_2$ in the sample is calculated (referring to the above sole reaction [1]). As 2 mol NaOH react with 1 mol $CO_2$, the mol ratio $NaOH/CO_2 = 2:1$
- A small excess to the calculated amount of NaOH is applied, a new prototype sample which include the NaOH scavenger is made according to real processing conditions or lab scale conditions.
- This new sample (being sufficiently sealed with diffusion tight facing according to the invention) is aged until a stable lambda value is achieved (accelerated ageing can be applied).
- Once lambda aged is stabilized, the residual NaOH is measured via titration, the residual $CO_2$ is measured via CGA.
- The exact amount of NaOH to have the desired $CO_2$ removal and/or the desired amount of residual NaOH can be fine-tuned via iteration.

Examples

Chemicals Used:
Polyisocyanate Suprasec® 5025 (S5025), a standard functionality polymeric MDI composition having an NCO %=31.0 and an average functionality=2.7 and viscosity at 25° C.=210 mPa.$)

Polyisocyanate Suprasec® 2085 (S2085), a high functionality polymeric MDI composition having NCO %=30.5 and an average functionality=2.9 and viscosity at 25° C.=625 mPa·s Foam stabilizer: silicon surfactant
Catalyst 1: N,N-dimethylcyclohexylamine
Catalyst 2: Pentamethyldiethylenetriamine
Catalyst 3: 1,3,5-tris(3-(dimethylamino)propyl)-hexahydro-s-triazine
Catalyst 4: potassium octoate based catalyst
Catalyst 5: potassium acetate based catalyst
Sodium hydroxide beads (ex Sigma Aldrich), NaOH (20-40 Mesh)
Sodium hydroxide Micropearls ex Prochimica
Polyol 1: sucrose/DELA initiated polyether polyol (OHv=585 mg KOH/g, viscosity at 25° C.=4400 mPa.$)
Polyol 2: DADPM/DEG initiated polyether polyol (OHv=310 mg KOH/g, viscosity at 25° C.=2000 mPa.$)
Polyol 3: glycerol/sorbitol initiated polyether polyol (OHv=500 mg KOH/g, viscosity at 25° C.=610 mPa.$)
Polyol 4: PTA based aromatic polyester polyol (OHv=240 mg KOH/g, viscosity at 25° C.=3000 mPa.$)
Flame retardant 1: Tris (chloroisopropyl) phosphate (TCPP)
Water
Blowing agent n-Pentane,
Blowing agent cyclo-Pentane,
HCFO Blowing agent Solstice® 1233zd ex Honeywell, trans-1-chloro-3,3,3-trifluoropropene, ($CHCl=CHCF_3$)
HFO Blowing agent Opteon® 1100 ex Chemours (cis-1,1,1,4,4,4-hexafluorobut-2-ene, $CF_3CH=CHCF_3$)
HFC Blowing agent Enovate® 245fa ex Honeywell 1. Fabrication of a PUR Comprising Insulation Foam Using $CO_2$ Scavenger and HCFO Blowing Agent (Example 1) and Comparative Example 1 Using No $CO_2$ Scavenger (Illustrating the Effect of the $CO_2$ Scavenger)

Two polyurethane comprising insulation foams were fabricated using an isocyanate index of 123.

Table 1 summarizes the reaction system and amounts of ingredients used in parts by weight (pbw) to fabricate
1) Example 1 according to the present invention using NaOH as a $CO_2$ scavenger and HCFO blowing agent Solstice® 1233zd, and
2) Comparative example 1 using no $CO_2$ scavenger and using HCFO blowing agent 1233zd as blowing agent.

Both foams were produced in a closed mould with dimensions 30 cm (Length) by 30 cm (Width) by 3 cm (Thickness) applying the same gas diffusion tight sealing according to the invention

TABLE 1

| Reaction system | Comparative 1 pbw | Invention (example 1) pbw |
|---|---|---|
| Polyol 1 | 29.7 | 29.7 |
| Polyol 2 | 15 | 15 |
| Polyol 3 | 50.8 | 50.8 |
| Catalyst 1 | 1.9 | 1.9 |
| Catalyst 2 | 0.5 | 0.5 |
| Catalyst 3 | 0.1 | 0.1 |
| Foam stabilizer | 0.7 | 0.7 |
| Water | 1.3 | 1.3 |

TABLE 1-continued

| Reaction system | Comparative 1 pbw | Invention (example 1) pbw |
|---|---|---|
| Blowing agent HCFO (Solstice ® 1233zd) | 7 | 7 |
| $CO_2$ scavenger (NaOH beads) | 0 | 21.6 |
| Molar ratio [X]/[X1] (**) | 0 | 7.5:1 |
| S5025 | 162 | 162 |
| Isocyanate Index | 123 | 123 |
| Foam density (kg/m³) | 63.5 | 71.7 |
| Facing | diffusion tight facing Lateral open (*) | diffusion tight facing Lateral open (*) |

(*) The foam was fabricated applying a gas diffusion tight sealing (a multilayer Aluminum comprising foil being impermeable for air) on top and bottom surfaces of the foam and leaving the lateral sides open (thickness). This leads to a foam wherein 83% of the surfaces of the foam are covered with a diffusion tight sealing.
(**) Molar ratio of added $CO_2$ scavenger [X] over the theoretical calculated molar amount of $CO_2$ generated by the reaction of the molar amount of water with molar amount of isocyanate being present in the formulation used to make the foam [X₁].

The residual amount of NaOH measured in the aged foam, measured stabilized aged lambda values as well as the measured molar % of $CO_2$ in the stabilized aged foam calculated on the total moles of $CO_2$ and physical blowing agents in the stabilized aged foam are given below:

| | Molar ratio [X]/[X1](*) | Amount of scavenger in the foam [% w/w] | measured stabilized lambda aged [mW/m · K] | measured $CO_2$ (stabilized aged) [% w/w] | measured physical BA (stabilized aged) [% w/w] | % $CO_2$ (**) (stabilized aged) [%] | Residual NaOH Measured in aged foam [% w/w] |
|---|---|---|---|---|---|---|---|
| Comparative 1 (no scavenger) | — | 0 | 23.6 | 2.2 | 1.32 | 83% | 0 |
| Example 1 (with scavenger) | 7.5:1 | 7.4 | 18.6 | 0.02 | 1.16 | 5% | 0.7 |

(*)Molar ratio of added $CO_2$ scavenger [X] over the theoretical calculated molar amount of $CO_2$ generated by the reaction of the molar amount of water with molar amount of isocyanate being present in the formulation used to make the foam [X₁]
(**) measured molar % of $CO_2$ in the stabilized aged foam calculated on the total moles of $CO_2$ and physical blowing agents in the stabilized aged foam.

FIG. 1 illustrates the lambda value measured at 10° C. for example 1 and comparative example 1 in function of time (ageing at room temperature). The synergistic effect of the $CO_2$ scavenger in combination with the use of a physical blowing agent with a lambda gas ≤12 mW/m·K at 10° C. (here HCFO blowing agent) under gas diffusion tight conditions is surprising and significant. Example 1 has a surprisingly low stabilized thermal conductivity <19 mW/m·K while the comparative example 1 has a much higher stabilized thermal conductivity with values >23 mW/m·K.

It can be seen that the effect of the $CO_2$ scavenger is complete after 8 weeks ageing, after that period the lambda value of the example 1 foam stabilizes. To ensure the lambda value remains stabilized, the foam should be covered at least partly with a diffusion tight sealing (a multilayer Aluminum comprising foil being impermeable for air and $CO_2$) on top and bottom surfaces of the foam.

The comparative example 1 illustrates that the use of low thermal conductivity blowing agents under gas diffusion tight conditions is not sufficient to achieve insulation foams having a long term low lambda value.

2. Fabrication of a PUR Comprising Insulation Foam Using $CO_2$ Scavenger, HCFO, HFO and HFC Blowing Agents (Examples 1, 2 and 3) and Comparative Examples 2+3 Using $CO_2$ Scavenger and Alternative Blowing Agents (Illustrating the Effect of the Blowing Agent)

Four polyurethane comprising insulation foams were fabricated in a closed mould with dimensions 30 cm (Length) by 30 cm (Width) by 3 cm (Thickness) using an isocyanate index of 123.

Table 2 summarizes the reaction system and amounts of ingredients used in parts by weight (pbw) to fabricate 1) Example 1 according to the present invention using NaOH as a $CO_2$ scavenger and HCFO blowing agent 1233zd, and
2) Example 2 according to the present invention using NaOH as a $CO_2$ scavenger and HFO blowing agent Opteon® 1100, and
3) Example 3 according to the present invention using NaOH as a $CO_2$ scavenger and HFC blowing agent Enovate® 245fa
4) Comparative example 2 using $CO_2$ scavenger NaOH and using n-pentane as blowing agent having a lambda gas >>12 mW/m·K at 10° C., and
5) Comparative example 3 using $CO_2$ scavenger NaOH and water as the only blowing agent.

All foams were produced applying the same gas diffusion tight sealing according to the invention (wherein 83% of the surfaces of the foam are covered with a gas diffusion tight sealing).

TABLE 2

| Reaction system | Comparative 2 pbw | Comparative 3 pbw | Invention (example 1) pbw | Invention (example 2) pbw | Invention (example 3) pbw |
|---|---|---|---|---|---|
| Polyol 1 | 29.7 | 29.7 | 29.7 | 29.7 | 29.7 |
| Polyol 2 | 15 | 15 | 15 | 15 | 15 |
| Polyol 3 | 50.8 | 50.8 | 50.8 | 50.8 | 50.8 |
| Catalyst 1 | 1.9 | 1.9 | 1.9 | 1.9 | 1.9 |
| Catalyst 2 | 0.5 | 0.5 | 0.5 | 0.5 | 0.5 |
| Catalyst 3 | 0.1 | 0.1 | 0.1 | 0.1 | 0.1 |
| Foam stabilizer | 0.7 | 0.7 | 0.7 | 0.7 | 0.7 |
| Water | 1.3 | 2.3 | 1.3 | 1.3 | 1.3 |
| Blowing agent HCFO (Solstice® 1233zd) | | | 7 | | |
| Blowing agent HFO (Opteon® 1100) | | | | 9 | |
| Blowing agent n-pentane | 3.9 | | | | |
| Blowing agent HFC 245fa | | | | | 7.2 |
| $CO_2$ scavenger (NaOH beads) | 21.3 | 22.5 | 21.6 | 21.7 | 21.6 |
| Molar ratio [X]/[X1] (**) | 7.4:1 | 4.4:1 | 7.5:1 | 7.5:1 | 7.5:1 |
| S5025 | 162 | 181 | 162 | 162 | 162 |
| Isocyanate Index | 123 | 123 | 123 | 123 | 123 |
| Foam density (kg/m³) | 67.6 | 68.8 | 71.7 | 73.1 | 72.1 |
| Facing | diffusion tight facing Lateral open (*) | diffusion tight facing Lateral open (*) | diffusion tight facing Lateral open (*) | diffusion tight facing Lateral open (*) | diffusion tight facing Lateral open (*) |

(*) The foam was fabricated applying a gas diffusion tight sealing (a multilayer Aluminum comprising foil being impermeable for Air) on top and bottom surfaces of the foam and leaving the lateral sides open. This leads to a foam wherein 83% of the surfaces of the foam are covered with a gas diffusion tight sealing.
(**) Molar ratio of added $CO_2$ scavenger [X] over the theoretical calculated molar amount of $CO_2$ generated by the reaction of the molar amount of water with molar amount of isocyanate being present in the formulation used to make the foam [X1].

The residual amount of NaOH measured in the aged foam, measured stabilized aged lambda values as well as the measured molar % of $CO_2$ in the stabilized aged foam calculated on the total moles of $CO_2$ and physical blowing agents in the stabilized aged foam are given below:

| | Molar ratio [X]/[X1](*) | Amount of scavenger in the foam [% w/w] | measured stabilized lambda aged [mW/m · K] | measured $CO_2$ (stabilized aged) [% w/w] | measured physical BA (stabilized aged) [% w/w] | % $CO_2$ (**) (stabilized aged) [%] | Residual NaOH Measured in aged foam [% w/w] |
|---|---|---|---|---|---|---|---|
| Example 1 (Solstice LBA) | 7.5:1 | 7.4 | 18.6 | 0.02 | 1.16 | 5% | 0.70 |
| Example 2 (Opteon 1100) | 7.5:1 | 7.4 | 17.8 | 0.02 | 2.61 | 3% | 0.60 |
| Example 3 (HFC 245fa) | 7.5:1 | 7.4 | 19.3 | 0.03 | 1.96 | 5% | 0.90 |

-continued

| | Molar ratio [X]/[X1]$^{(*)}$ | Amount of scavenger in the foam [% w/w] | stabilized lambda aged [mW/m · K] | measured $CO_2$ (stabilized aged) [% w/w] | measured physical BA (stabilized aged) [% w/w] | % $CO_2$ $^{(**)}$ (stabilized aged) [%] | Residual NaOH Measured in aged foam [% w/w] |
|---|---|---|---|---|---|---|---|
| Comparative 2 (n-pentane) | 7.4:1 | 7.4 | 23.3 | 0.02 | 0.7 | 5% | 0.60 |
| Comparative 3 (Water Blown) | 4.4:1 | 7.4 | 28$^{(***)}$ | 0.09 | 0 | 100% | 0.10 |

$^{(*)}$Molar ratio of added $CO_2$ scavenger [X] over the theoretical calculated molar amount of $CO_2$ generated by the reaction of the molar amount of water with molar amount of isocyanate being present in the formulation used to make the foam [X$_1$]
$^{(**)}$ measured molar % of $CO_2$ in the stabilized aged foam calculated on the total moles of $CO_2$ and physical blowing agents in the stabilized aged foam.
$^{(***)}$at 14 weeks not yet stabilized.

Figure 2:
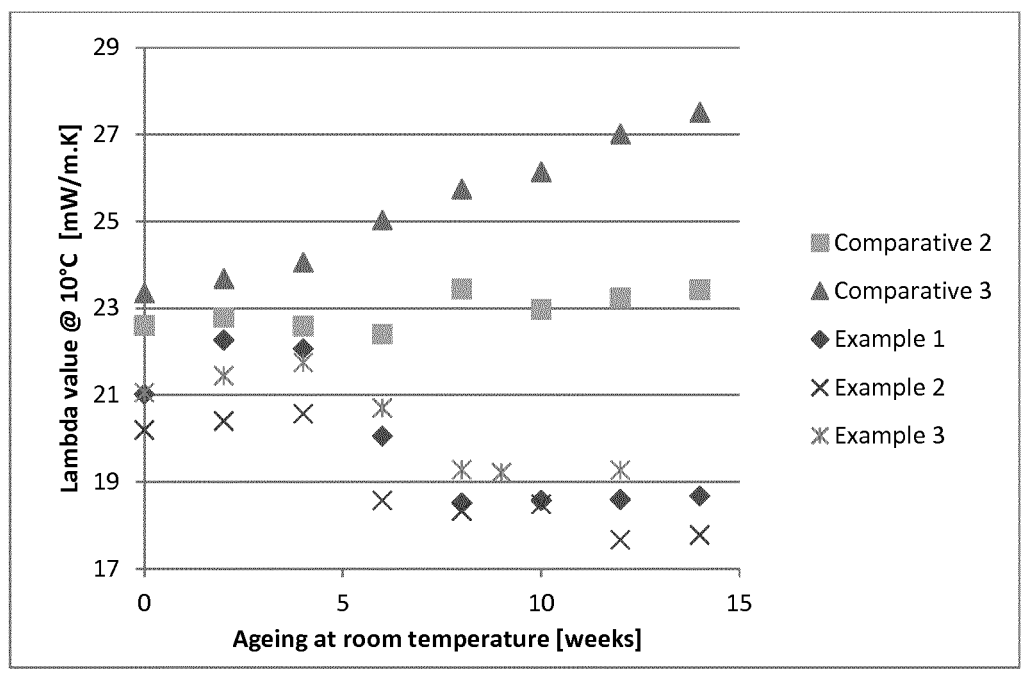

FIG. 2 illustrates the lambda value measured at 10° C. for example 1, example 2, example 3 and comparative examples 2 and 3 in function of time (ageing at room temperature). The synergistic effect of the $CO_2$ scavenger in combination with the use of a physical blowing agent with a lambda gas ≤12 mW/m·K at 10° C. under air diffusion tight conditions is again surprising and significant. The comparative examples illustrate that the use of a $CO_2$ scavenger under gas diffusion tight conditions is not sufficient to achieve insulation foams having a long term low lambda value.

It can be seen that the effect of the $CO_2$ scavenger is complete after 8 weeks ageing, after that period the lambda value of the example foams 1, 2 and 3 stabilizes. To ensure the lambda value remains stabilized, the foam should be covered with a gas diffusion tight sealing (impermeable for air) on top and bottom surfaces of the foam.

3. Fabrication of a PIR Comprising Insulation Foam Using $CO_2$ Scavenger and HCFO Blowing Agent (Example 1) and Comparative Example 4 Eliminating Gas Diffusion Tight Conditions (Illustrating the Effect of Sealing the Foam)

Two polyurethane comprising insulation foams were fabricated in a closed mould with dimensions 30 cm (Length) by 30 cm (Width) by 3 cm (Thickness) using an isocyanate index of 123.

Table 3 summarizes the reaction system and amounts of ingredients used in parts by weight (pbw) to fabricate 1) Example 1 according to the present invention using NaOH as a $CO_2$ scavenger and a physical blowing agent with a lambda gas ≤12 mW/m·K at 10° C. (being here HCFO blowing agent Solstice® 1233zd) under gas diffusion tight conditions, and 2) Comparative example 4 using NaOH as a $CO_2$ scavenger and a physical blowing agent with a lambda gas ≤12 mW/m·K at 10° C. (being here HCFO blowing agent 1233zd but no gas diffusion tight conditions (with gas permeable paper facing).

TABLE 3

| Reaction system | Comparative 4 pbw | Invention (example 1) pbw |
|---|---|---|
| Polyol 1 | 29.7 | 29.7 |
| Polyol 2 | 15 | 15 |
| Polyol 3 | 50.8 | 50.8 |
| Catalyst 1 | 1.9 | 1.9 |
| Catalyst 2 | 0.5 | 0.5 |
| Catalyst 3 | 0.1 | 0.1 |
| Foam stabilizer | 0.7 | 0.7 |
| Water | 1.3 | 1.3 |
| Blowing agent HCFO (Solstice ® 1233zd) | 7 | 7 |
| $CO_2$ scavenger (NaOH beads) | 21.6 | 21.6 |
| Molar ratio [X]/[X1] $^{(**)}$ | 7.5:1 | 7.5:1 |
| S5025 | 162 | 162 |
| Isocyanate Index | 123 | 123 |
| Foam density (kg/m$^3$) | 70.3 | 71.7 |
| Facing | Gas permeable paper facing | Gas diffusion tight facing Lateral open $^{(*)}$ |

$^{(*)}$ The foam was fabricated applying a gas diffusion tight sealing (impermeable for Air) on top and bottom surfaces of the foam and leaving the lateral sides open. This leads to a foam wherein 83% of the surfaces of the foam are covered with a gas diffusion tight sealing (a multilayer Aluminum comprising foil being impermeable for Air).
$^{(**)}$ Molar ratio of added $CO_2$ scavenger [X] over the theoretical calculated molar amount of $CO_2$ generated by the reaction of the molar amount of water with isocyanate being present in the formulation used to make the foam [X$_1$].

The residual amount of NaOH measured in the aged foam, measured stabilized aged lambda values as well as the measured molar % of $CO_2$ in the stabilized aged foam calculated on the total moles of $CO_2$ and physical blowing agents in the stabilized aged foam are given below:

| | Molar ratio [X]/[X1] (*) | Amount of scavenger in the foam [% w/w] | stabilized lambda aged [mW/m · K] | measured $CO_2$ (stabilized aged) [% w/w] | measured physical BA (stabilized aged) [% w/w] | % $CO_2$ (**) (stabilized aged) [%] | Residual NaOH Measured in aged foam [% w/w] |
|---|---|---|---|---|---|---|---|
| Comparative 4 | 7.5:1 | 7.4 | 21.2 | 0.07 | 1.23 | 14 | 0.9 |
| Example 1 | 7.5:1 | 7.4 | 18.6 | 0.02 | 1.16 | 5 | 0.7 |

(*) Molar ratio of added $CO_2$ scavenger [X] over the theoretical calculated molar amount of $CO_2$ generated by the reaction of the molar amount of water with molar amount of isocyanate being present in the formulation used to make the foam [$X_1$]
(**) measured molar % of $CO_2$ in the stabilized aged foam calculated on the total moles of $CO_2$ and physical blowing agents in the stabilized aged foam.

Figure 3:
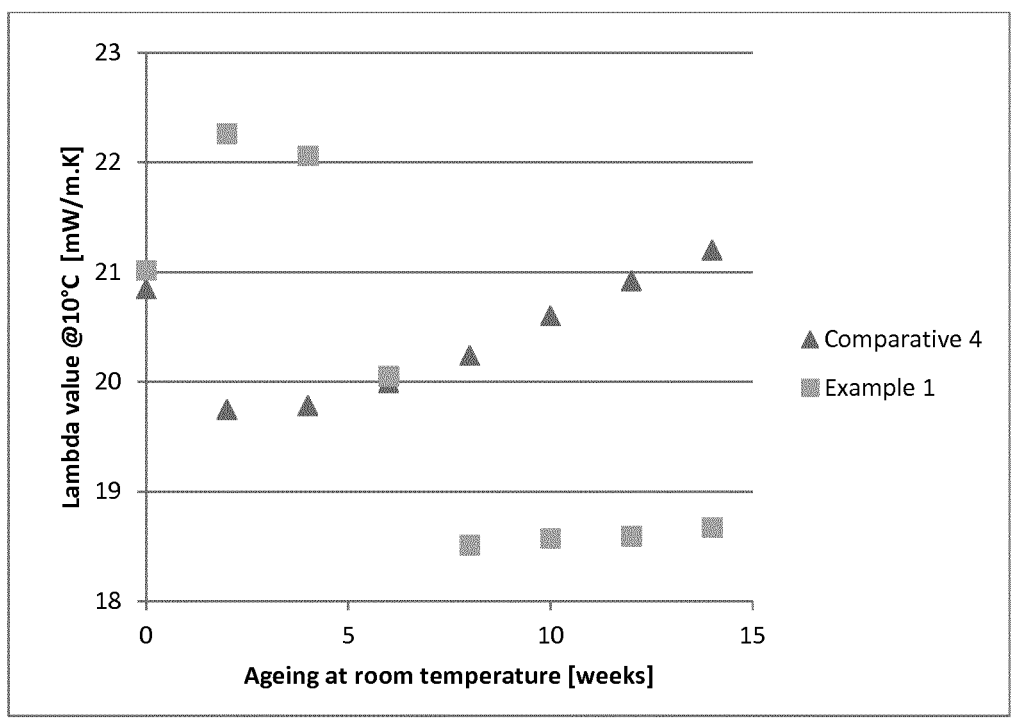
FIG. 3 illustrates the influence of diffusion tight conditions of the foam on the lambda value (measured at 10° C.) in function of time (ageing at room temperature) for a foam made according to the invention (example 1) and for a comparative foam (comparative example 4).

FIG. 3 illustrates the lambda value measured at 10° C. for example 1 and comparative example 4 in function of time (ageing at room temperature). The synergistic effect of the $CO_2$ scavenger in combination with the use of a HCFO blowing agent and presence of a sealing is surprising and significant. Example 1 has a surprisingly low stabilized thermal conductivity <19 mW/m·K while the comparative example 4 has no stabilized thermal conductivity, to the contrary the thermal conductivity is increasing (deteriorating) over time.

It can be seen that the effect of the $CO_2$ scavenger is complete after 8 weeks ageing, after that period the lambda value of the example 1 stabilizes. To ensure the lambda value remains stabilized, the foam should be covered with a gas diffusion tight sealing (impermeable for Air) on top and bottom surfaces of the foam.

The comparative example 4 illustrates that the application of a sealing to achieve gas diffusion tight conditions according to the invention is essential to achieve insulation foams having a long term low lambda value.

4. Fabrication of a PIR Comprising Insulation Foam Using HCFO as Physical Blowing Agent and Different Amounts of $CO_2$ Scavenger (Illustrating the Required Amount of the $CO_2$ Scavenger)

Five polyisocyanurate comprising insulation foams were fabricated using an isocyanate index of 320.

Table 4 summarizes the reaction system and amounts of ingredients used in parts by weight (pbw) to fabricate:

1) Comparative example A0 using no scavenger and using HCFO blowing agent Solstice LBA, and
2) Comparative example A1 using a molar ratio of added $CO_2$ scavenger [X] over the theoretical calculated molar amount of $CO_2$ generated by the reaction of the molar amount of water with molar amount of isocyanate being present in the formulation used to make the foam [$X_1$] of 3:1 and using HCFO blowing agent Solstice LBA, and
3) Example A2 using a molar ratio of added $CO_2$ scavenger [X] over the theoretical calculated molar amount of $CO_2$ generated by the reaction of the molar amount of water with molar amount of isocyanate being present in the formulation used to make the foam [$X_1$] of 15:1 and using HCFO blowing agent Solstice LBA, and
4) Example A3 according to the invention using a molar ratio of added $CO_2$ scavenger [X] over the theoretical calculated molar amount of $CO_2$ generated by the reaction of the molar amount of water with molar amount of isocyanate being present in the formulation used to make the foam [$X_1$] of 33:1 and using HCFO blowing agent Solstice LBA, and
5) Example A4 according to the invention using a molar ratio of added $CO_2$ scavenger [X] over the theoretical calculated molar amount of $CO_2$ generated by the reaction of the molar amount of water with molar amount of isocyanate being present in the formulation used to make the foam [$X_1$] of 21:1 and using HCFO blowing agent Solstice LBA.

All foams were produced in a closed mould with dimensions 30 cm (Length) by 30 cm (Width) by 3 cm (Thickness) applying 100% gas diffusion tight EVOH sealing according to the invention.

TABLE 4

| Reaction system | Comparative A0 pbw | Comparative A1 pbw | Example A2 pbw | Example A3 pbw | Example A4 pbw |
|---|---|---|---|---|---|
| Polyol 4 | 80.16 | 80.16 | 80.16 | 80.16 | 80.16 |
| Flame retardant 1 | 16 | 16 | 16 | 16 | 16 |
| Catalyst 2 | 0.1 | 0.1 | 0.1 | 0.1 | 0.1 |
| Catalyst 4 | 1.36 | 1.36 | 1.36 | 1.36 | 1.36 |
| Catalyst 5 | 0.45 | 0.45 | 0.45 | 0.45 | 0.45 |
| Foam stabilizer | 1.6 | 1.6 | 1.6 | 1.6 | 1.6 |
| Water | 0.33 | 0.33 | 0.33 | 0.33 | 0.33 |
| Blowing agent HCFO (Solstice ® 1233zd) | 32.7 | 32.7 | 32.7 | 32.7 | 32.7 |
| $CO_2$ scavenger (NaOH Micropearls) | 0 | 2.2 | 10.9 | 24.0 | 15.2 |
| Molar ratio [X]/[X1] (**) | — | 3:1 | 15:1 | 33:1 | 21:1 |
| S2085 | 170 | 170 | 170 | 170 | 170 |
| Isocyanate Index | 320 | 320 | 320 | 320 | 320 |
| Foam density (kg/m³) | 44.7 | 45.8 | 46.2 | 48.2 | 46.4 |
| Facing | diffusion tight facing (*) | diffusion tight facing (*) | diffusion tight facing (*) | diffusion tight facing (*) | diffusion tight facing (*) |

(*) The foam was fabricated applying a gas diffusion tight sealing made of EVOH thereby fully encapsulating the foam (100% coverage).
(**) Molar ratio of added $CO_2$ scavenger [X] over the theoretical calculated molar amount of $CO_2$ generated by the reaction of the molar amount of water with molar amount of isocyanate being present in the foam [$X_1$].

The residual amount of NaOH measured in the aged foam, measured stabilized aged lambda values as well as the measured molar % of $CO_2$ in the stabilized aged foam calculated on the total moles of $CO_2$ and physical blowing agents in the stabilized aged foam are given below:

|  | Molar ratio [X]/[X1] (*) | Amount of scavenger in the foam [% w/w] | stabilized lambda aged [mW/m · K] | measured $CO_2$ (stabilized aged) [% w/w] | measured HFO (stabilized aged) [% w/w] | % $CO_2$ (**) (stabilized aged) [%] | Residual NaOH measured in aged foam [% w/w] |
|---|---|---|---|---|---|---|---|
| Comparative A0 | — | 0 | 19.0 | 2.72 | 9.14 | 47% | 0 |
| Comparative A1 | 3:1 | 0.7 | 18.6 | 1.78 | 9.21 | 36% | 0 |
| Example A2 | 15:1 | 3.5 | 17.4 | 0.30 | 8.84 | 9% | 0 |
| Example A4 | 21:1 | 4.8 | 16.6 | 0 | 8.52 | 0% | 0.2 |
| Example A3 | 33:1 | 7.3 | 16.5 | 0 | 8.43 | 0% | 2.7 |

(*) Molar ratio of added $CO_2$ scavenger [X] over the theoretical calculated molar amount of $CO_2$ generated by the reaction of the molar amount of water with molar amount of isocyanate being present in the formulation used to make the foam [X1].
(**) Measured molar % of $CO_2$ in the stabilized aged foam calculated on the total moles of $CO_2$ and physical blowing agents in the stabilized aged foam.

Figure 4:
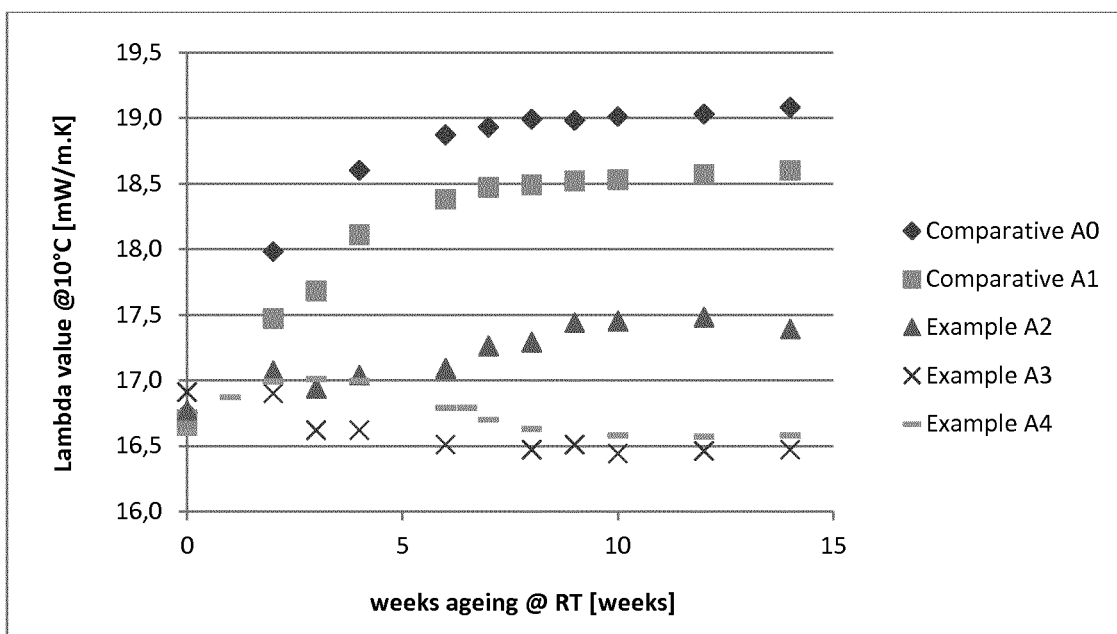
FIG. 4 illustrates the lambda value measured at 10° C. for examples A2-A4 according to the invention and comparative examples A0-A1 in function of time (ageing at room temperature) using HCFO as physical blowing agent and different amounts of $CO_2$ scavenger (illustrating the required amount of the $CO_2$ scavenger).

FIG. 4 illustrates the lambda value measured at 10° C. for examples A2-A4 and comparative examples A0-A1 in function of time (ageing at room temperature). The synergistic effect of the optimized amount of $CO_2$ scavenger in combination with the use of a physical blowing agent with a lambda gas ≤12 mW/m·K at 10° C. (here HCFO blowing agent) under gas diffusion tight conditions is surprising and significant. Examples A3 and A4 have surprisingly low stabilized thermal conductivity (<17 mW/m·K while the comparative examples A1 and A0 have much higher stabilized thermal conductivity with values (>18.5 mW/m·K).

It can be seen that the effect of the $CO_2$ scavenger is complete after 8 weeks ageing, after that period the lambda value of the foam stabilizes. To ensure the lambda value remains stabilized, the foam should be covered with a diffusion tight sealing (here made of EVOH thereby fully encapsulating the foam (100% coverage)).

The comparative example A1 illustrates that a molar ratio [X]/[X1] of 3:1 is not enough to have a sufficient $CO_2$ reduction because with ageing, if the foam is sealed from gas transmission but not from moisture diffusion, the $CO_2$ amount increases further. Therefore, a molar ratio [X]/[X1] much greater than 3:1 is required.

The example A2 illustrates that even with a molar ratio [X]/[X1] of 15:1, no residual NaOH is found in the aged foam which means that all NaOH was consumed in the $CO_2$ scavenging process, contributing to lambda reduction. Therefore a molar ratio [X]/[X1] much greater than 3:1 is required.

5. Fabrication of a PIR Comprising Insulation Foam Using Different Amounts of $CO_2$ Scavenger and Cyclo-Pentane as a Physical Blowing Agent (Illustrating the Required Amount of the $CO_2$ Scavenger)

Five polyisocyanurate comprising insulation foams were fabricated using an isocyanate index of 320.

Table 5 summarizes the reaction system and amounts of ingredients used in parts by weight (pbw) to fabricate
1) Comparative example B0 using no scavenger and using cyclo-pentane as physical blowing agent, and
2) Comparative example B1 using a molar ratio of added $CO_2$ scavenger [X] over the theoretical calculated molar amount of $CO_2$ generated by the reaction of the molar amount of water with molar amount of isocyanate being present in the formulation used to make the foam [X1] of 3:1 and using cyclo-pentane as physical blowing agent, and
3) Example B2 using a molar ratio of added $CO_2$ scavenger [X] over the theoretical calculated molar amount of $CO_2$ generated by the reaction of the molar amount of water with molar amount of isocyanate being present in the formulation used to make the foam [X1] of 15:1 and using cyclo-pentane as physical blowing agent, and
4) Example B3 according to the invention using a molar ratio of added $CO_2$ scavenger [X] over the theoretical calculated molar amount of $CO_2$ generated by the reaction of the molar amount of water with molar amount of isocyanate being present in the formulation used to make the foam [X1] of 33:1 and using cyclo-pentane as physical blowing agent.

All foams were produced in a closed mould with dimensions 30 cm (Length) by 30 cm (Width) by 3 cm (Thickness) applying 100% gas diffusion tight EVOH sealing according to the invention.

TABLE 5

| Reaction system | Comparative B0 pbw | Comparative B1 pbw | Example B2 pbw | Example B3 pbw |
|---|---|---|---|---|
| Polyol 4 | 80.16 | 80.16 | 80.16 | 80.16 |
| Flame retardant 1 | 16 | 16 | 16 | 16 |
| Catalyst 2 | 0.1 | 0.1 | 0.1 | 0.1 |
| Catalyst 4 | 1.36 | 1.36 | 1.36 | 1.36 |
| Catalyst 5 | 0.45 | 0.45 | 0.45 | 0.45 |
| Foam stabilizer | 1.6 | 1.6 | 1.6 | 1.6 |
| Water | 0.33 | 0.33 | 0.33 | 0.33 |
| Blowing agent Cyclo-pentane | 17.2 | 17.2 | 17.2 | 17.2 |
| $CO_2$ scavenger (NaOH Micropearls) | 0 | 2.2 | 10.9 | 24.0 |
| Molar ratio [X]/[X1] (**) | — | 3:1 | 15:1 | 33:1 |
| S2085 | 170 | 170 | 170 | 170 |
| Isocyanate Index | 320 | 320 | 320 | 320 |
| Foam density (kg/m³) | 45.3 | 45.3 | 46.5 | 48.7 |
| Facing | diffusion tight facing (*) | diffusion tight facing (*) | diffusion tight facing (*) | diffusion tight facing (*) |

(*) The foam was fabricated applying a gas diffusion tight sealing made of EVOH thereby fully encapsulating the foam (100% coverage).
(**) Molar ratio of added $CO_2$ scavenger [X] over the theoretical calculated molar amount of $CO_2$ generated by the reaction of the molar amount of water with molar amount of isocyanate being present in the formulation used to make the foam [X1].

The residual amount of NaOH measured in the aged foam, measured stabilized aged lambda values as well as the measured molar % of $CO_2$ in the stabilized aged foam calculated on the total moles of $CO_2$ and physical blowing agents in the stabilized aged foam are given below:

|  | Molar ratio [X]/[X1]$^{(*)}$ | Amount of scavenger in the foam [% w/w] | stabilized lambda aged [mW/m · K] | measured $CO_2$ (stabilized aged) [% w/w] | measured cyclo pentane (stabilized aged) [% w/w] | % $CO_2$$^{(**)}$ (stabilized aged) [%] | Residual NaOH measured in aged foam [% w/w] |
|---|---|---|---|---|---|---|---|
| Comparative B0 | — | 0 | 21.2 | 2.98 | 5.05 | 48% | 0 |
| Comparative B1 | 3:1 | 0.7 | 21.0 | 2.41 | 5.1 | 43% | 0 |
| Example B2 | 15:1 | 3.7 | 20.3 | 0.25 | 4.92 | 8% | 0 |
| Example B3 | 33:1 | 7.7 | 19.1 | 0 | 4.67 | 0% | 1.75 |

$^{(*)}$Molar ratio of added $CO_2$ scavenger [X] over the theoretical calculated molar amount of $CO_2$ generated by the reaction of the molar amount of water with molar amount of isocyanate being present in the formulation used to make the foam [X$_1$].
$^{(**)}$measured molar % of $CO_2$ in the stabilized aged foam calculated on the total moles of $CO_2$ and physical blowing agents in the stabilized aged foam.

Figure 5:
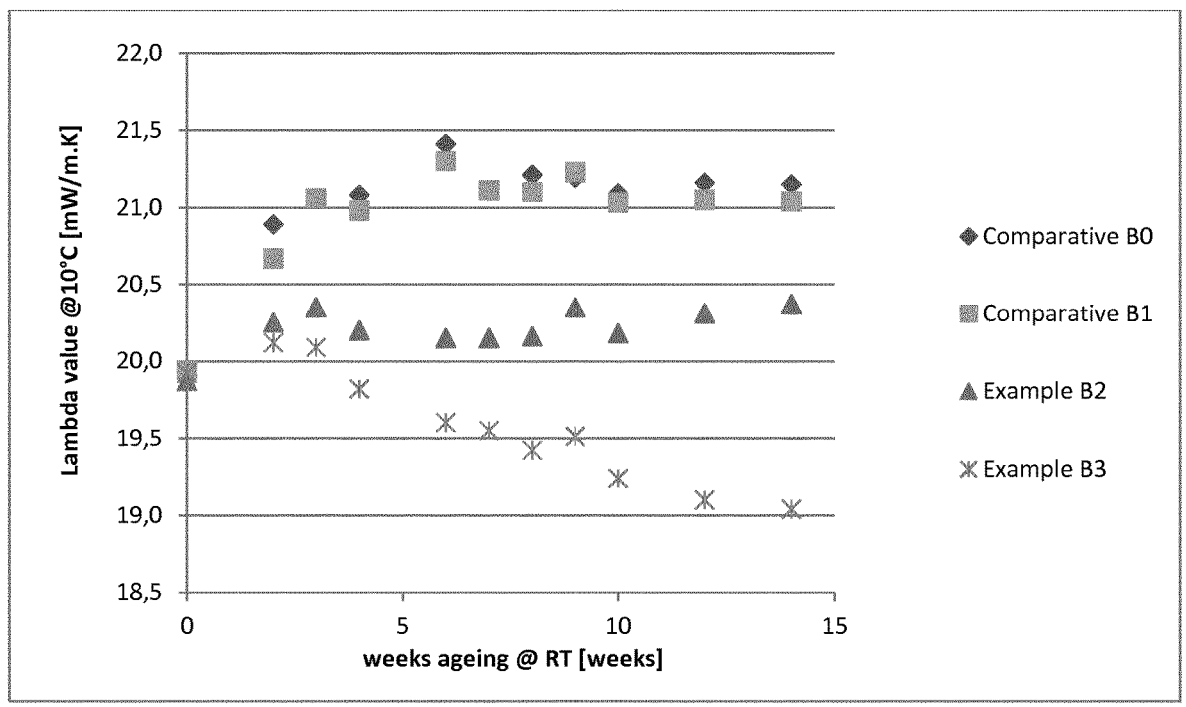
FIG. 5 illustrates the lambda value measured at 10° C. for examples B2-B3 according to the invention and comparative examples B0-B1 in function of time (ageing at room temperature) using cyclo-pentane as physical blowing agent and different amounts of $CO_2$ scavenger (illustrating the required amount of the $CO_2$ scavenger).

FIG. 5 illustrates the lambda value measured at 10° C. for examples B2-B3 and comparative examples B0-B1 in function of time (ageing at room temperature). The synergistic effect of the optimized amount of $CO_2$ scavenger in combination with the use of a physical blowing agent with a lambda gas ≤12 mW/m·K at 10° C. (here cyclo-pentane blowing agent) under gas diffusion tight conditions is surprising and significant. Example B3 has surprisingly low stabilized thermal conductivity (around 19 mW/m·K while the comparative examples B1 and B0 have much higher stabilized thermal conductivity with values (around 21 mW/m·K).

It can be seen that the effect of the $CO_2$ scavenger is complete after 8 weeks ageing, after that period the lambda value of the foam stabilizes. To ensure the lambda value remains stabilized, the foam should be covered with a diffusion tight sealing (here gas diffusion tight sealing made of EVOH thereby fully encapsulating the foam (100% coverage)).

The comparative example B1 illustrates that a molar ratio [X]/[X1] of 3:1 is not enough to have a sufficient $CO_2$ reduction because with ageing, if the foam is sealed from gas transmission but not from moisture diffusion, the $CO_2$ amount increases further. Therefore a molar ratio [X]/[X1] much greater than 3:1 is required.

6. Fabrication of a PUR Comprising Insulation Foam Using HFO as Physical Blowing Agent and Different Amounts of $CO_2$ Scavenger (Illustrating the Required Amount of the $CO_2$ Scavenger)

Four polyurethane comprising insulation foams were fabricated using an isocyanate index of 123.

Table 6 summarizes the reaction system and amounts of ingredients used in parts by weight (pbw) to fabricate
1) Comparative example D0 using no scavenger and using HFO blowing agent Solstice LBA, and
2) Comparative example D1 using a molar ratio of added $CO_2$ scavenger [X] over the theoretical calculated molar amount of $CO_2$ generated by the reaction of the molar amount of water with molar amount of isocyanate being present in the formulation used to make the foam [X$_1$] of 3:1 and using HCFO blowing agent Solstice 1233zd, and
3) Example D2 using a molar ratio of added $CO_2$ scavenger [X] over the theoretical calculated molar amount of $CO_2$ generated by the reaction of the molar amount of water with molar amount of isocyanate being present in the formulation used to make the foam [X$_1$] of 5:1 and using HCFO blowing agent Solstice 1233zd, and
4) Example D3 according to the invention using a molar ratio of added $CO_2$ scavenger [X] over the theoretical calculated molar amount of $CO_2$ generated by the reaction of the molar amount of water with molar amount of isocyanate being present in the formulation used to make the foam [X$_1$] of 7.5:1 and using HCFO blowing agent Solstice 1233zd.

All foams were produced in a closed mould with dimensions 30 cm (Length) by 30 cm (Width) by 3 cm (Thickness) applying 100% gas diffusion tight EVOH sealing according to the invention.

TABLE 6

| Reaction system | Comparative D0 pbw | Comparative D1 pbw | Example D2 pbw | Example D3 pbw |
|---|---|---|---|---|
| Polyol 1 | 29.7 | 29.7 | 29.7 | 29.7 |
| Polyol 2 | 15 | 15 | 15 | 15 |
| Polyol 3 | 50.8 | 50.8 | 50.8 | 50.8 |
| Catalyst 1 | 1.9 | 1.9 | 1.9 | 1.9 |
| Catalyst 2 | 0.5 | 0.5 | 0.5 | 0.5 |
| Catalyst 3 | 0.1 | 0.1 | 0.1 | 0.1 |
| Foam stabilizer | 0.7 | 0.7 | 0.7 | 0.7 |
| Water | 1.3 | 1.3 | 1.3 | 1.3 |
| Blowing agent HCFO (Solstice ® 1233zd) | 7 | 7 | 7 | 7 |
| $CO_2$ scavenger (NaOH Micropearls) | 0 | 8.7 | 14.4 | 21.7 |
| Molar ratio [X]/[X1] $^{(**)}$ | — | 3:1 | 5:1 | 7.5:1 |
| S5025 | 162 | 162 | 162 | 162 |
| Isocyanate Index | 123 | 123 | 123 | 123 |
| Foam density (kg/m$^3$) | 71.4 | 71.7 | 74.0 | 75.8 |
| Facing | diffusion tight facing $^{(*)}$ | diffusion tight facing $^{(*)}$ | diffusion tight facing $^{(*)}$ | diffusion tight facing $^{(*)}$ |

$^{(*)}$ The foam was fabricated applying a gas diffusion tight sealing made of EVOH thereby fully encapsulating the foam (100% coverage).
$^{(**)}$ Molar ratio of added $CO_2$ scavenger [X] over the theoretical calculated molar amount of $CO_2$ generated by the reaction of the molar amount of water with molar amount of isocyanate being present in the formulation used to make the foam [X$_1$].

The residual amount of NaOH measured in the aged foam, the measured stabilized aged lambda values as well as the measured molar % of $CO_2$ in the stabilized aged foam calculated on the total moles of $CO_2$ and physical blowing agents in the stabilized aged foam are given below:

| | Molar ratio [X]/[X1](*) | Amount of scavenger in the foam [% w/w] | stabilized lambda aged [mW/m·K] | measured $CO_2$ (stabilized aged) [% w/w] | measured HFO (stabilized aged) [% w/w] | % $CO_2$(**) (stabilized aged) [%] | Residual NaOH measured in aged foam [% w/w] |
|---|---|---|---|---|---|---|---|
| Comparative D0 | — | 0 | 23.4 | 2.86 | 2.19 | 79% | 0 |
| Comparative D1 | 3:1 | 3.1 | 22.1 | 1.12 | 2.14 | 61% | 0 |
| Example D2 | 5:1 | 5.1 | 20.6 | 0.23 | 2.08 | 25% | 0 |
| Example D3 | 7.5:1 | 7.5 | 18.4 | 0 | 2.06 | 0% | 0.84 |

(*)Molar ratio of added $CO_2$ scavenger [X] over the theoretical calculated molar amount of $CO_2$ generated by the reaction of the molar amount of water with molar amount of isocyanate being present in the formulation used to make the foam [$X_1$].
(**)measured molar % of $CO_2$ in the stabilized aged foam calculated on the total moles of $CO_2$ and physical blowing agents in the stabilized aged foam.

Figure 6:
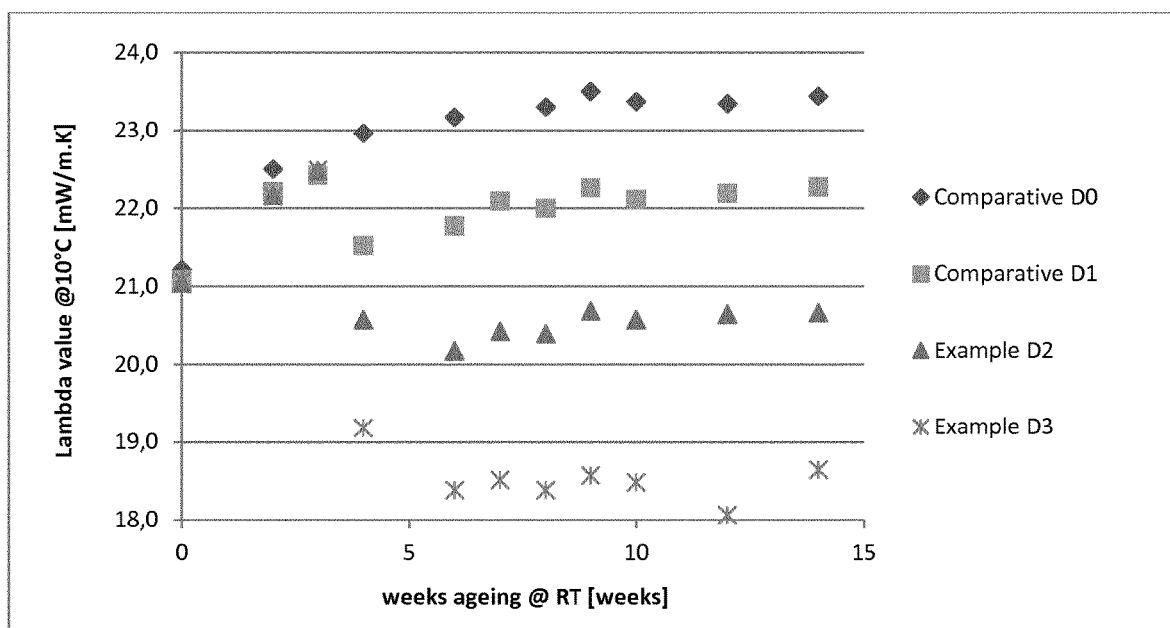
FIG. 6 illustrates the lambda value measured at 10° C. for examples D2-D3 according to the invention and comparative examples D0-D1 in function of time (ageing at room temperature) using HCFO as physical blowing agent and different amounts of $CO_2$ scavenger (illustrating the required amount of the $CO_2$ scavenger).

FIG. 6 illustrates the lambda value measured at 10° C. for examples D2-D3 and comparative examples D0-D1 in function of time (ageing at room temperature). The synergistic effect of the optimized amount of $CO_2$ scavenger in combination with the use of a physical blowing agent with a lambda gas ≤12 mW/m·K at 10° C. (here HCFO blowing agent) under gas diffusion tight conditions is surprising and significant. Example D3 has a surprisingly low stabilized thermal conductivity (<19 mW/m·K and while the comparative examples A1 and A0 have much higher stabilized thermal conductivity with values (>22 mW/m·K).

It can be seen that the effect of the $CO_2$ scavenger is complete after 8 weeks ageing, after that period the lambda value of the foam stabilizes. To ensure the lambda value remains stabilized, the foam should be covered with a diffusion tight sealing (here sealing made of EVOH thereby fully encapsulating the foam (100% coverage)).

The comparative example D1 illustrates that a molar ratio [X]/[X1] of 3:1 is not enough to have a sufficient $CO_2$ reduction because with ageing, if the foam is sealed from gas transmission but not from moisture diffusion, the $CO_2$ amount increases further. Therefore, a molar ratio [X]/[X1] much greater than 3:1 is required.

The invention claimed is:

1. A method for making a stabilized aged polyisocyanurate (PIR) comprising insulation foam, said method comprising:

combining and/or mixing at least the following ingredients at an isocyanate index higher than 250 to form an insulation foam:
a polyisocyanate composition comprising one or more polyisocyanate compounds;
at least one catalyst compound suitable for making the stabilized aged polyisocyanurate (PIR) insulation foam;
an isocyanate-reactive composition comprising one or more isocyanate reactive compounds including water;
at least one physical blowing agent having a lambda gas value ≤12 mW/m·K at 10° C.;
at least one $CO_2$ scavenging compound selected from NaOH and/or KOH;
covering at least 50% of the insulation foam with a gas diffusion tight sealing to avoid exchange of air between the insulation foam and the environment; and
ageing the insulation foam to achieve the stabilized aged polyisocyanurate (PIR) insulation foam;
wherein the insulation foam is covered with a gas diffusion tight sealing and the amount of $CO_2$ scavenging compound is such that the molar % $CO_2$ in the stabilized aged polyisocyanurate (PIR) insulation foam is between 0 and 33% calculated on the total moles of $CO_2$ and the at least one physical blowing agent in the stabilized aged polyisocyanurate (PIR) insulation foam, and the amount of residual at least one $CO_2$ scavenging compound in the stabilized aged polyisocyanurate (PIR) insulation foam is greater than 0 and up to 10 wt % calculated on the total weight of the stabilized aged polyisocyanurate (PIR) insulation foam, and wherein the ratio of the molar amount of the at least one $CO_2$ scavenging compound [X] to be added over the theoretical calculated molar amount of $CO_2$ [$X_1$] generated by the reaction of the molar amount of water the one more polyisocyanate compounds present in the formulation used to make the foam [X]/[$X_1$] is higher than 6.

2. The method according to claim 1, wherein one or more polyisocyanate compounds are selected from the group consisting of a toluene diisocyanate, a methylene diphenyl diisocyanate, a polyisocyanate composition comprising a methylene diphenyl diisocyanate, or mixtures thereof.

3. The method according to claim 1, wherein the one or more isocyanate reactive compounds comprise polyols and polyol mixtures having average hydroxyl numbers of from 50 to 1000, and hydroxyl functionalities of from 2 to 8.

4. The method according to claim 1, wherein the at least one physical blowing agent is present in an amount of 1 to 60 parts by weight per hundred parts by weight of the one or more isocyanate reactive compounds.

5. The process according to claim 1, further comprising beside the at least one physical blowing agent having a lambda gas value ≤12 mW/m·K at 10° C. additional blowing agents having a lambda gas value >12 mW/m·K at 10° C. and wherein the ratio of the at least one physical blowing agent having a lambda gas value ≤12 mW/m·K at 10° C. to the additional blowing agents is in the weight ratio 95/5 up to 5/95 calculated on the total weight of all blowing agents.

6. The process according to claim 1, wherein the molar % $CO_2$ in the stabilized aged foam is between 0 and 27%.

7. The process according to claim 1, wherein the amount of residual at least one $CO_2$ scavenging compound in the stabilized aged foam is between greater than 0 and 5 wt % calculated on the total weight of the stabilized aged foam.

8. The process according to claim 1, wherein the amount of residual at least one $CO_2$ scavenging compound in the stabilized aged foam is between greater than 0 and 3 wt % calculated on the total weight of the stabilized aged foam.

9. The process according to claim 1, wherein the gas diffusion tight sealing is selected from a gas barrier polymeric resin layer or a metal foil.

10. The process according to claim 1, wherein the at least one physical blowing agent is selected from the group consisting of cis 1,1,1,4,4,4-hexafluorobut-2-ene, and/or trans 1-chloro-3,3,3-trifluoropropene, or combinations thereof.

11. The process according to claim 1, wherein the at least one physical blowing agent is selected from the group consisting of chlorofluorocarbons (CFCs) and/or hydrofluorocarbons (HFCs) and/or hydrochlorofluorocarbons (HCFCs) having a lambda gas value ≤12 mW/m·K at 10° C.

* * * * *